(12) United States Patent
Mertens-Thomas

(10) Patent No.: US 10,647,615 B2
(45) Date of Patent: May 12, 2020

(54) METHOD FOR PRODUCING A THERMALLY INSULATING MORTAR

(71) Applicant: Tanja Thomas, Hameln (DE)

(72) Inventor: Antonius Mertens-Thomas, Hameln (DE)

(73) Assignee: Tanja Thomas, Hameln (DE)

( * ) Notice: Subject to any disclaimer, the term of this patent is extended or adjusted under 35 U.S.C. 154(b) by 0 days.

(21) Appl. No.: 15/712,435

(22) Filed: Sep. 22, 2017

(65) Prior Publication Data

US 2018/0086674 A1    Mar. 29, 2018

(30) Foreign Application Priority Data

Sep. 23, 2016 (DE) .................. 10 2016 011 471

(51) Int. Cl.
| | | |
|---|---|---|
| *C04B 38/10* | (2006.01) | |
| *C04B 28/02* | (2006.01) | |
| *C04B 28/04* | (2006.01) | |
| *C04B 24/16* | (2006.01) | |
| *C04B 111/40* | (2006.01) | |

(52) U.S. Cl.
CPC .............. *C04B 38/10* (2013.01); *C04B 28/02* (2013.01); *C04B 28/04* (2013.01); *C04B 24/161* (2013.01); *C04B 2111/40* (2013.01); *C04B 2201/30* (2013.01); *C04B 2201/32* (2013.01); *Y02W 30/97* (2015.05)

(58) Field of Classification Search
CPC .............. C04B 2111/40; C04B 2201/30; C04B 24/161; C04B 38/10
See application file for complete search history.

(56) References Cited

U.S. PATENT DOCUMENTS

| | | | | |
|---|---|---|---|---|
| 2,827,386 | A * | 3/1958 | Zimmerman | ........... B28C 5/003 106/713 |
| 4,414,031 | A * | 11/1983 | Studinka | ............. C04B 16/0658 428/36.4 |
| 8,119,207 | B2 * | 2/2012 | Rigaudon | ........... C04B 40/0028 427/430.1 |
| 9,624,420 | B1 * | 4/2017 | Wang | ..................... C09K 8/487 |
| 2012/0172469 | A1 | 7/2012 | Perez-Pena | |
| 2012/0312193 | A1 * | 12/2012 | Jezequel | ................. C04B 28/04 106/678 |

FOREIGN PATENT DOCUMENTS

| | | | |
|---|---|---|---|
| CN | 102964103 A | * | 3/2013 |
| DE | 202010018124 U1 | | 6/2014 |
| RU | 2132835 C1 | | 7/1999 |
| RU | 2134250 C1 | | 8/1999 |
| WO | WO9412328 A1 | | 6/1994 |

* cited by examiner

*Primary Examiner* — Shuangyi Abu Ali
(74) *Attorney, Agent, or Firm* — Greer, Burns & Crain, Ltd.

(57) ABSTRACT

A method for producing a thermally insulating mortar includes introducing water, cement and a liquid surfactant containing a foam concentrate that forms a foam in a predetermined mixing ratio into a mixing device provided with a mixing impeller, and rotating the mixing impeller at a very high speed, wherein a homogeneous mixing between the water, the cement and the formed foam occurs.

11 Claims, No Drawings

METHOD FOR PRODUCING A THERMALLY INSULATING MORTAR

FIELD OF THE INVENTION

The present invention refers to a method for producing a thermally insulating mortar, which may be provided on site or at constructions sites. The mortar contains pores, which reduce the density of the mortar and provide the mortar with thermally insulating properties.

BACKGROUND OF THE INVENTION

In porous mortar or porous concrete, according to the type of production method, a distinction is made between cellular concrete or cellular mortar and foamed concrete or foamed mortar. Cellular concrete is only produced in special concrete constructions and contains an expanding agent made of highly explosive hydrogen, which is generated by reaction of aluminum with cement in the concrete and which forms pores. This method requires a complex process controlling and is very energetic, and cannot be performed on site or at construction sites.

In foamed concrete or foamed mortar, a harmless foam is used as a pore-forming agent. This method requires a foaming agent, a foam generator, a foamed concrete mixer as well as a pump. The foam produced with the foam generator and the foaming agent is directly admixed with the finished mixed concrete or mortar. This method can be easily controlled, is energy-saving, time-saving and is suitable for mobile use. It allows a reduction of density of concrete or mortar from 1900 kg/m$^3$ up to 400 kg/m$^3$. A decisive drawback of "pre-foaming" consists in that it is almost impossible to mix the finished foam in a uniformly dosed manner, whereby deviations within the finished mixture in excess of 20% are caused. The drying time in this method lies between about 4 and 8 days.

The foaming agents are defined, according to active agent base, as protein-based and surfactant-based (synthetic foaming agents).

Protein-based foaming agents are usually produced by protein-hydrolysis of animal proteins, from horn, blood, bones and similar wastes of cattle, pigs and other animal cadavers. Varying raw materials cause fluctuations in the end product as well as a very unpleasant smell of products.

Synthetic foaming agents are of purely chemical origin at constant quality, and are used for producing foamed concrete, but are not preferred, due to their frequent lower stability.

In general, a drawback of pre-foamed foam lies in the fact that no 100% mixing with the binder cement or plaster is possible.

BRIEF SUMMARY OF THE INVENTION

The object of the present invention is to provide a method for producing a porous mortar or a porous concrete, in which above mentioned drawbacks are avoided.

This object is achieved by means of characteristics of claim 1. Advantageous embodiments of the inventive method are characterized in the dependent claims.

In the inventive method, water, cement and a liquid surfactant-foam concentrate (liquid surfactant containing, foam generating concentrate) are introduced in a predefined mixing ratio into a mixing device provided with a mixing impeller provided with an essentially horizontal drive shaft and the mixing impeller rotates at very high speed, wherein a homogenous mixing between water, cement and the forming foam takes place, and the foam is distributed in the water-cement mixture in such a finely dispersed way, that a colloidal suspension or dispersion is formed.

The term "colloids" indicates particles or droplets, which are finely dispersed in the dispersion medium, which, in the present case, is a cement-water mixture. The size of individual particles preferably lies in the nanometer or micrometer range.

The colloid-dispersed mortar mass has an enormous boundary surface, due to the fine dispersion of the formed foam between the latter and the water-cement mixture. A homogeneous mixing between water, cement and the foam formed in the mixing device occurs, causing the forming foam and cement to be united in one unit in the colloidal mixing process.

The mortar provided by the invention has optimal thermally insulating properties as well as a high strength, due to the microscopic pores, which are uniformly dispersed in the mixture. The porous mortar is non-flammable and free from biological polluting construction substances with respect to ambient air.

In order to produce the inventive colloidal suspension or dispersion, a mixing device is required, in which the mixing speed at the mixing impeller is very high. A speed of 3-4 m/s is preferred. In this way, gravimetric forces act on the dispersion to be mixed. Due to the high rotational speed of preferably about 8,000 rpm, and the gravimetric friction effects thus generated on the container walls of the mixing device, it is assumed that the structure of the water-cement mixture is broken and its surface is increased 100-fold. A new molecular structure is thus formed within the dispersion, which ensures the highest degree of homogeneous mixing.

A preferred mixing ratio of the inventive porous mortar comprises 25 kg cement, preferably Portland cement PZ 52.5 CEM 1, 20-25 liters of water and 200 ml of liquid surfactant-foam concentrate. This mixture provides, after a preferred mixing time of 2-3 minutes in the mixing device, a mortar mass of 120-130 liters.

The liquid surfactant-foam concentrate preferably comprises:

8 to 15% of sodium C10-C16 alkyl sulfate,
1 to 3% of sodium alpha-olefin sulfonate,
7 to 10% of ammonium alkyldimethyl chloride,
50 to 84% of water, preferably 50 to 74% of water.

100-150 ml of a superplasticizer (polycarboxylate ether) and/or 80 g of synthetic fibers (preferably 20 mm long) and/or 10 liters of cork granulate (preferably 1-4 mm) may be admixed with above said preferred mixing ratio. The synthetic fibers increase strength, whereas the cork granulate provides an increased footstep sound insulation.

The bulk density of mortar lies between 100 and 1,000 kg/m$^3$ and is determined by the proportion of above said components. The material thus mixed requires a drying time of about 24 hours. The thermal conductivity of dried mortar is about 0.069 W/(m·K).

The inventive mortar is fully recyclable and does not cause any disposal problems, as is the case in many conventional insulating materials. The energy consumption in the production by means of a cold process is low and may be classified as $CO_2$-neutral. The mortar fulfils the requirements of the European construction products regulation and is in fire protection class A1, is thermally insulating, permeable to vapor diffusion, free from pollutants dangerous to ambient air, and is reusable. The material may be completely recycled, in that it is ground and only the components of the water and foam concentrate are introduced into a new mixing process.

Examples of application areas are:
- cavity filling in indoor and outdoor environments;
- roof insulation;
- pavement leveling (simultaneous leveling of pipes laid on the pavement and of the first insulation layer);
- swimming pool edge forming as a thermal insulation layer.

The invention claimed is:

1. A method for producing a thermally insulating mortar, consisting of:
   introducing only water, cement and a liquid concentrate surfactant that forms a foam into a mixing device provided with a mixing impeller;
   wherein the liquid concentrate surfactant has a ratio of 8 to 15% of sodium C10-C16 alkyl sulfate, 1 to 3% of sodium alpha-olefin sulfonate, 7 to 10% of ammonium alkyldimethyl chloride, and 50 to 84% of water;
   rotating the mixing impeller at a speed of 8,000 rpm, whereby a homogeneous water-cement mixture and the formed foam occurs, wherein the foam is distributed in the water-cement mixture in such a finely dispersed way that a colloidal suspension or dispersion is formed.

2. The method of claim 1, wherein the speed of the water-cement mixture at the mixing impeller is 3 to 4 m/s.

3. The method of claim 1, wherein a mixing ratio of cement to water to liquid concentrate surfactant is 25 kg to 20-25 l to 200 ml.

4. The method of claim 1, wherein the cement used is Portland cement PZ 52.5 CEM 1.

5. A method for producing a thermally insulating mortar, consisting of:
   introducing only water, cement, a liquid concentrate surfactant that forms a foam, and synthetic fibers into a mixing device provided with a mixing impeller;
   wherein the liquid concentrate surfactant has a ratio of 8 to 15% of sodium C10-C16 alkyl sulfate, 1 to 3% of sodium alpha-olefin sulfonate, 7 to 10% of ammonium alkyldimethyl chloride, and 50 to 84% of water;
   rotating the mixing impeller at a speed of 8,000 rpm, whereby a homogeneous water-cement mixture and the formed foam occurs, wherein the foam is distributed in the water-cement mixture in such a finely dispersed way that a colloidal suspension or dispersion is formed.

6. A method for producing a thermally insulating mortar, consisting of:
   introducing only water, cement, a liquid concentrate surfactant that forms a foam, and cork granulate into a mixing device provided with a mixing impeller;
   wherein the liquid concentrate surfactant has a ratio of 8 to 15% of sodium C10-C16 alkyl sulfate, 1 to 3% of sodium alpha-olefin sulfonate, 7 to 10% of ammonium alkyldimethyl chloride, and 50 to 84% of water;
   rotating the mixing impeller at a speed of 8,000 rpm, whereby a homogeneous water-cement mixture and the formed foam occurs, wherein the foam is distributed in the water-cement mixture in such a finely dispersed way that a colloidal suspension or dispersion is formed.

7. The method of claim 1 further wherein the liquid concentrate surfactant has a ratio of 50 to 74% of water.

8. The method of claim 5 further wherein the liquid concentrate surfactant has a ratio of 50 to 74% of water.

9. The method of claim 6 further wherein the liquid concentrate surfactant has a ratio of 50 to 74% of water.

10. The method of claim 5, wherein 80 g of synthetic fibers are added to a mixing ratio of cement to water to liquid concentrate surfactant of 25 kg to 20-25 l to 200 ml.

11. The method of claim 6, wherein 10 l of cork granulate is added to a mixing ratio of cement to water to liquid concentrate surfactant of 25 kg to 20-25 l to 200 ml.

* * * * *